June 15, 1965 E. D. NUTTALL 3,189,696

DEVICE FOR REGULATING MULTIPLE CONCURRENT ELECTRIC PULSES

Filed Oct. 12, 1962

2 Sheets-Sheet 1

INVENTOR
Edwin D. Nuttall

BY Adolph G. Hugin
ATTORNEY

June 15, 1965 E. D. NUTTALL 3,189,696

DEVICE FOR REGULATING MULTIPLE CONCURRENT ELECTRIC PULSES

Filed Oct. 12, 1962

2 Sheets-Sheet 2

INVENTOR

Edwin D. Nuttall

BY Adolph E. Hugin

ATTORNEY

United States Patent Office 3,189,696
Patented June 15, 1965

3,189,696
DEVICE FOR REGULATING MULTIPLE CONCURRENT ELECTRIC PULSES

Edwin D. Nuttall, Shreveport, La., assignor to United Gas Corporation, a corporation of Delaware
Filed Oct. 12, 1962, Ser. No. 230,148
12 Claims. (Cl. 200—11)

This invention relates to devices for regulating multiple concurrent electrical pulses, and is particularly adapted to regulate the duration of a plurality of pulses occurring substantially simultaneously and for regulating the timing of such pulses.

The increasing complexity of modern business and industry, particularly in the volume of units, readings, etc. that must be handled, has developed a need for a portable or semi-portable device, relatively small in size and simple to operate, which is capable of recording information for input into computers. The device may be used for any purpose in which the listing of numbers, preparation of tallies, lists, or the like required. For example, the device might be used in stores for taking inventory, in railroads for freight car checking, and in meter reading operations for making a record of meter readings and the like.

An important aspect of these devices is the need for small light-weight and reliable components. It is especially necessary that such components assure an accurate entry or recordation for each item of information. A magnetic digital recorder for providing these desired results is disclosed in detail in a copending application of John R. Davis et al., Serial No. 165,717, filed January 4, 1962, entitled "Magnetic Digital Recorder," assigned to the assignee of the present application. Such magnetic recorders are adapted to make a record of the information in accordance with a predetermined code. Various of these codes have been developed and more or less standardized, so that the recordation of the information may be placed upon a suitable magnetic tape and subsequently processed through a computer with or without the assistance of an interpreter or converter which makes the codified information available for use by the computer.

In general, the record on the magnetic tape is made by a plural track magnetic recording head which is adapted magnetically to record in any selected number of tracks according to the required codified representation for the information being recorded. As a result of this type of code operation, the plural track recording head often is required to impress a magnetic force on the tape on more than one track. These tracks normally extend longitudinally of the tape and preferably are parallel to each other and to the edges of the tape. In most modern recorders provision is made for adjustment of the recording head so as to prevent skew of the head with reference to the edges of the magnetic tape in order to obtain substantial transverse alignment of pulses in the different tracks when these pulses represent a single digit in the recordation.

In the magnetic recorder disclosed in the above copending application and similar recorders, various digit switches conventionally are set by the operator to indicate the information which is to be recorded by the magnetic recording head on the magnetic tape. A commutator usually also is provided which sequentially commutates the various digit switches so as to energize the recording head sequentially in accordance with the setting of the respective digit switches. The commutator may comprise wafer switches which include a plurality of wafers each having a plurality of circumferentially spaced stationary contacts and a wiping contactor adapted to close respective circuits with the stationary contacts. Corresponding stationary contacts and the wiper contactor of each wafer are respectively mounted in substantially axial alignment, so that operation of the wafer switches produces an engagement by the wiper contactor of each wafer with a stationary contact thereof which is aligned with corresponding contacts on the other wafers.

With such an arrangement the electric pulses produced by the closing of the circuit through the contacts of each wafer occur substantially simultaneously and therefore energize the multiple-track recording head in a manner which will impress a magnetic recordation substantially simultaneously in each track transversely of the magnetic tape. The accuracy of the recordation of the pulses in the different tracks of the magnetic tape depends on the accuracy of the making and breaking of the electrical circuits by the different wiper contactors with the respective stationary contacts of the wafer switches. Normal manufacturing tolerances do not provide for the exact uniform spacing between stationary contacts on such wafer switches and also do not assure the uniform duration of contact between the wiper contactor and all of the stationary contacts. Thus, it is not possible to obtain an accurate and uniform duration of the recorded pulses on the magnetic tape or to obtain a uniform starting and stopping of the pulses recorded on the magnetic tape due to the slight manufacturing inaccuracies in the angular spacing of the stationary contacts. Some computers do not require as much accuracy as others in the coded information which is supplied thereto, and electronic correcting means can be built into interpreter units used with the computers when required. Such correcting means usually would be more expensive than the provision of accurately recorded coded information on the magnetic tape.

In accordance with the present invention, a multiple-pulse regulating device is provided which is operable for concurrently initiating and concurrently ending electric pulses in all circuits or circuit lines which are made or closed and broken by or opened through a plurality of multiple circuit making and breaking means, such as the wafer switches of a commutator in a magnetic recorder utilizing a multiple-track recording head. This multiple-pulse regulating device is adapted to regulate the duration of the pulses so as to provide for a uniform duration of all pulses in all tracks for all digits of a code and also provides for regulating the timing of the pulses with reference to the digit switches.

An object of the present invention is to provide an improved multiple-pulse regulation device.

Another object of the present invention is to provide a multiple-pulse regulating device which is adapted to adjust uniformly the duration of all of the pulses.

A further object of the present invention is to provide an improved multiple-pulse regulating device which is adapted to provide for adjusting the timing of the occurrence of electrical pulses.

Yet another object of the present invention is to provide an improved multiple-pulse regulating device for concurrently adjusting the opening and closing of an electric circuit whereby the duration of electric pulses can be varied and also for adjusting the timing of the occurrence of such electric pulses.

Further objects and advantages of this invention will become apparent from the following description referring to the accompanying drawings, and the features of novelty which characterize this invention will be pointed out with particularity in the claims appended to and forming a part of this specification.

Figure 1:
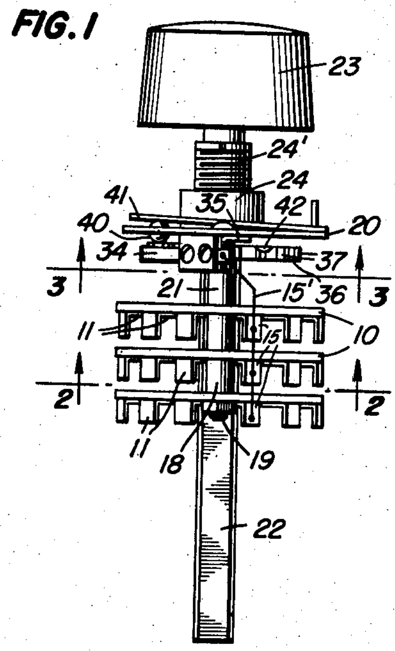
FIG. 1 is a side elevational view of a multiple-pulse regulating switch embodying the present invention, which is particularly useful as a multiple-pulse regulating device for regulating both the timing and duration of electrical pulses.
Figure 2:
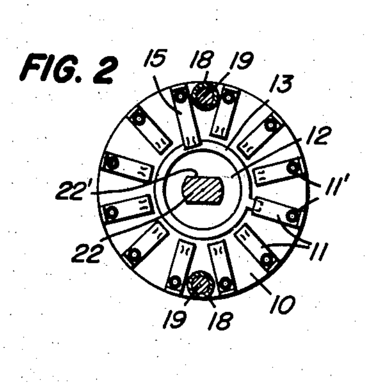
FIG. 2 is a sectional view, taken along line 2—2 of FIG. 1, illustrating a suitable embodiment of a wafer switch which can be utilized in a multiple-pulse regulating device in accordance with the present invention.

Referring to the drawings, an embodiment of the present invention is illustrated, in FIGS. 1–4, applied to three-wafer switches adapted to be used as a commutator in a magnetic digital recorder, such as that disclosed in the above-mentioned copending application. The wafer switches which form part of the commutator comprise three circular wafer insulating contact supporting members 10 to which a plurality of circumferentially spaced stationary contacts 11 are secured in any suitable manner, as by rivets 11'. A central wafer insulating disc 12, on which a slip ring 13 is mounted, is arranged within each of the circular insulating members 10. A wiper contactor 14 is connected to the slip ring 13 in any suitable manner, as by being formed integrally therewith, and is of a size to provide for making an electrical contact with each of the stationary contacts 11 and for breaking the electrical contact with one of the contacts 11 before making contact with an adjacent contact. FIG. 2 illustrates details of this construction. One of the stationary contacts 15 is made longer than the other stationary contacts 11 and provides an electrical wiping engagement with the slip ring 13, so that a circuit can be formed from the stationary contact 15 to any one of the stationary contacts 11 through the slip ring 13 and the wiper contactor 14.

Figures 4, 5:
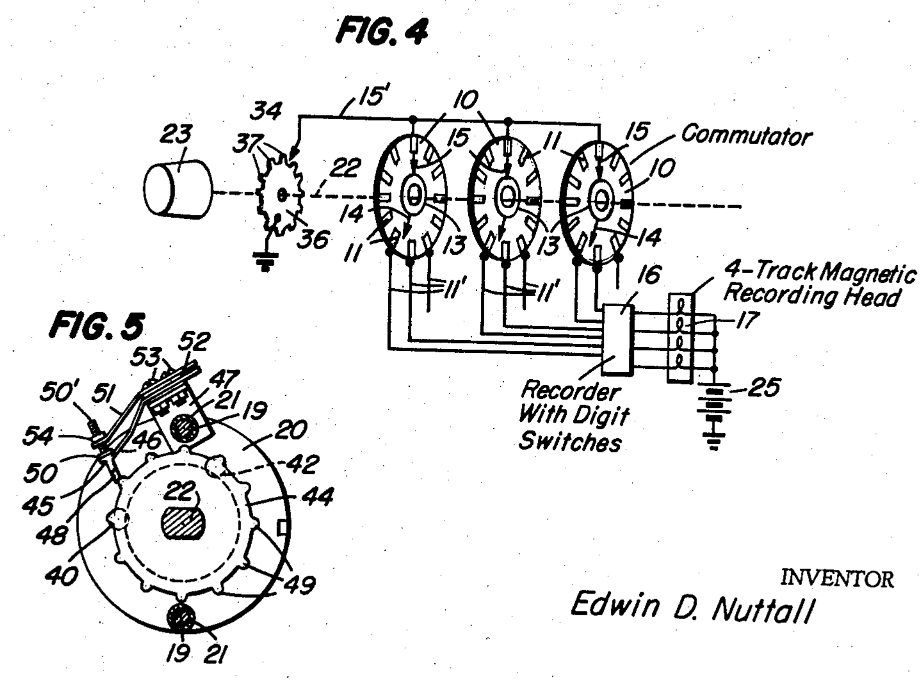
FIG. 4 is a schematic diagram illustrating the connection of the multiple-pulse regulating device shown in FIGS. 1, 2, and 3 in a magnetic digital recorder provided with a four-track magnetic recording head.
FIG. 5 illustrates details of a modification of the multiple-pulse regulating device mechanism shown in FIGS. 1 and 3, with additional means for regulating the duration of electrical pulses.

In order to commutate the coded information which is represented by the setting of a plurality of digit switches 16 in a recorder, FIG. 4, in a manner so that the settings of these digit switches can be sequentially entered on magnetic tape by a suitable magnetic recording head 17, the commutator is provided with a plurality of wafer switches as required for reading and entering the setting of all of the digit switches 16 into the magnetic recording head 17 by connecting the commutator stationary contacts 11 by conductors 11' to the digit switches 16. In the illustrated example, the commutator comprises the three wafer switch contact supporting insulating members 10 and the associated respective contacts and contactors. These three supporting members 10 are axially spaced by insulating spacer elements 18 secured together by a suitable bolt 19. This bolt 19 also secures the wafer supporting members 10 to a main mounting plate 20 from which the uppermost supporting member 10 is spaced by insulating spacer elements 21. The supporting members 10 of the wafer switches are mounted relatively to each other so that the stationary contacts 11 and 15 are arranged in sets comprising one contact of each wafer switch in axial alignment with a corresponding contact of each of the other wafer switches. The wiper contactors 14 of the three wafer switches also are supported in axial alignment by the insulating discs 12, and these discs are secured in position relative to each other by being rigidly mounted on a commutator shaft 22 formed with flat sides 22' adapted to engage corresponding flat sides of central openings in the discs 12. The discs are secured in position on the shaft 22 in any suitable manner, as by staking the shaft on each side of the discs. This construction provides a plurality of spaced multiple-contact wafer switches, each having a wiper contactor 14 insulated from and drivingly mounted substantially in axial alignment on the commutator shaft 22 and operable thereby to engage separately each stationary contact 11 of its respective multiple-contact wafer switch.

As is best shown in FIG. 4, the commutator reads the settings of the recorder digit switches by the sequential engagement of the movable contactors 14 of the wafer switches with the succession of stationary wafer switch contacts 11. This sequential closing of electric circuits by the movable wiping contactors 14 through the stationary contacts 11 is obtained by rotating the commutator shaft 22 which supports the wiper contactor insulating disc 12. Such actuation of the shaft 22 may conveniently be obtained in a manually operable commutator, such as that shown in FIGS. 1, and 4, by providing a suitable operating knob 23 on the shaft 22 and arranging this knob in a conveniently accessible position with reference to the recorder structure. In the illustrated construction, the shaft 22 is adapted to be rotatably supported by a bearing 24 having a threaded end 24' which may be used to secure the bearing in the cover of a recorder casing thereby providing for the support of the commutator and its operating knob 23 on the recorder casing.

In a recorder such as that schematically illustrated in FIG. 4, the recordation of information on magnetic tape is adapted to be made by a four-track magnetic recording head 17, which is energized by any suitable source, such as a battery 25, when the circuit for the coils of the different tracks of the recording head are closed through the recorder digit switches and the commutator. Energization of the coils of the magnetic record head 17 in a return-to-zero type magnetic digital recorder is in the form of electrical pulses which have a duration corresponding to the time during which the electrical circuit is closed for energizing these coils. In a system utilizing wafer switches, similar to that illustrated in FIG. 2, for the digit switches and also wafer switches of this type in the commutator as shown in FIG. 1, the duration of the electrical pulse energizing the recording head coils may vary slightly, depending upon the slight variations in the configuration of the contacting portion of the stationary contacts 11, and the pulse initiation and pulse ending also will vary due to variations in the angular spacing between the stationary contacts 11. These variations may be relatively slight, but will occur as normal manufacturing inaccuracies.

Figures 6, 7, 8, 9, 10, 11, 12:
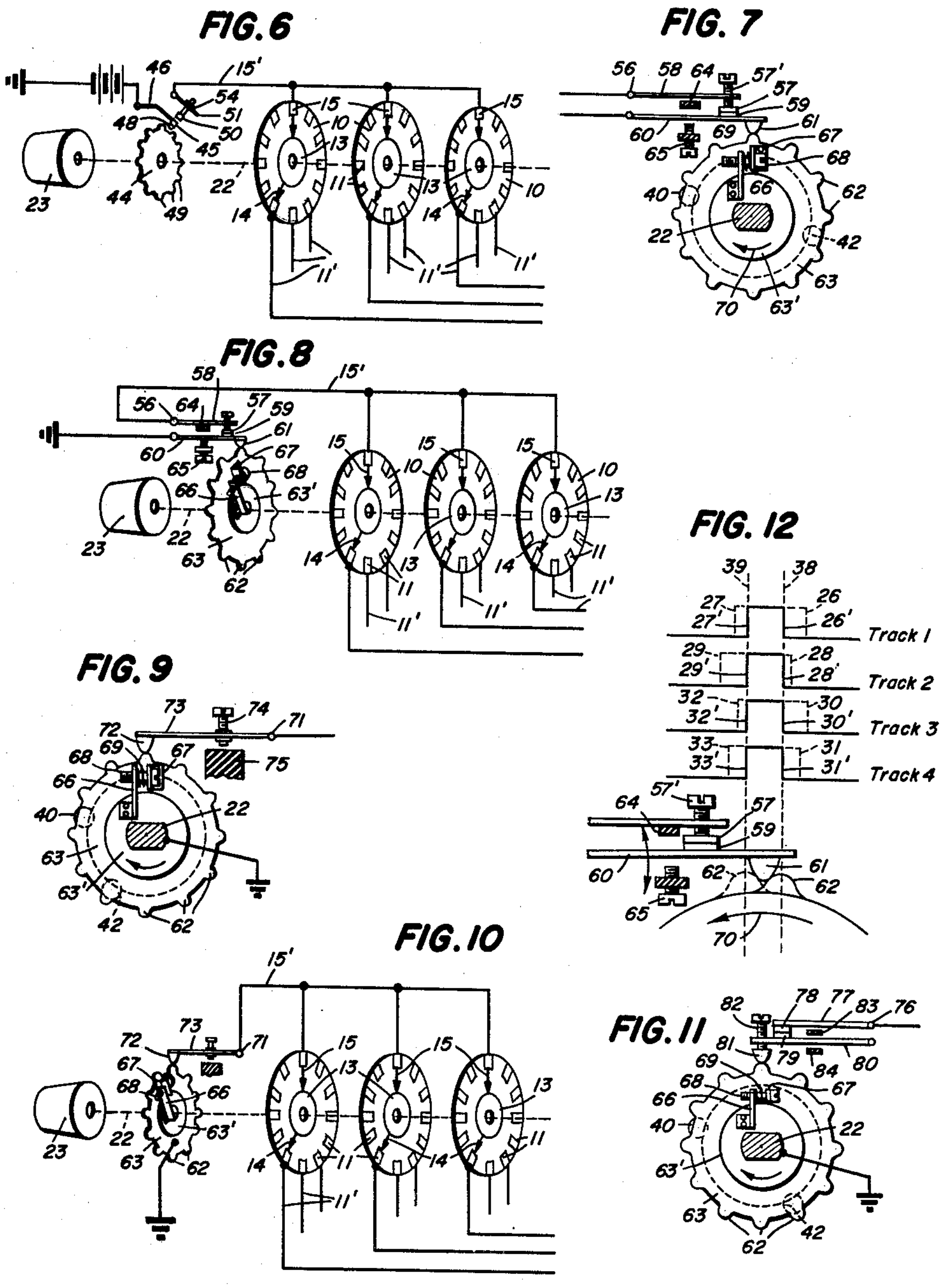
FIG. 6 is a schematic diagram similar to FIG. 4 illustrating the multiple-pulse regulating device of FIG. 5 in connection with a commutator similar to that shown in FIG. 1.
FIG. 7 illustrates another embodiment of the present invention with a different provision for regulating the timing of the electrical pulses and the duration of such pulses, which regulation may be made more accurately and more simply than with the structures shown in FIGS. 3 and 5.
FIG. 8 is a schematic diagrammatic representation of the multiple-pulse regulating device shown in FIG. 7, applied to a commutator of the type shown in FIG. 1, and adapted to be used in a system such as that shown in FIG. 4.
FIG. 9 illustrates a further modification of a multiple-pulse regulating device, somewhat similar to that of FIG. 7, and slightly more simple in construction.
FIG. 10 is a schematic diagrammatic representation of the multiple-pulse regulating device of FIG. 9 applied to a commutator of the type shown in FIG. 1 and adapted to be used in a system such as that of FIG. 4.
FIG. 11 is a further modification of the multiple-pulse regulating devices of FIGS. 7 and 9.
FIG. 12 diagrammatically illustrates the manner in which all of the multiple-pulse regulating devices shown in the other figures regulate the duration and timing of pulses in accordance with the present invention.

The variations in the pulses which energize the four coils of a four-track magnetic recording head 17 produce corresponding pulse variations or variations in the magnetic bits in a magnetic tape as is diagrammatically illustrated in FIG. 12. As there shown, the initiation of a magnetic bit in track 1 is shown by the dotted line 26 and its ending by the dotted line 27. The pulse duration is represented by the line extending between the ends of lines 26 and 27. This is the pulse or magnetic bit which would be recorded on a magnetic tape by completing the energizing circuit of the recording head for track 1 through the recorder digit switches and the commutator wafer switches. Similarly, the recorded pulse or magnetic bit in the tape in track 2 would be initiated as indicated by the dotted line 28 and end as indicated by the dotted line 29. In like manner, the pulses or magnetic bits in tracks 3 and 4 would be initiated as indicated by lines 30 and 31 and end as indicated by lines 32 and 33. The non-alignment of the lines 26, 28, 30, and 31 and of lines 27, 29, 32, and 33 clearly shows the variations in the initiation and ending of the pulses or magnetic bits which would be recorded on a magnetic tape by the use of conventional wafer switches as the commutator switches for such a recorder. The illustrated variations would also not be uniform for successive pulses or bits in each track as the variations in successive stationary contacts 11 of the wafer switches would seldom be uniform, such that the spacing between successive bits in each track also would be irregular.

For most computers, such a recordation would affect the accuracy of the results obtained by the use of the recorded information, and it would be desirable to eliminate the variations in the length or duration of the pulses, as well as the variations in the initiation and ending of the pulses, so that pulses of uniform duration and uniform spacing would be obtained in all four tracks of the multiple-track tape, and in addition the initiation and ending of pulses in the different tracks would be transversely aligned on the tape for each recorded digit. In accordance with the present invention, provision is made for closing the recording head energizing circuit only after all of the commutator contactors 14 have completed their engagement with stationary contacts 11 and for breaking this electrical circuit before any of the contactors 14 have become disengaged from their respective stationary contacts. The action of this type of commutator structure is to provide electrical energizing pulses concurrently to all of the tracks to be energized in the recording head and concurrently to break the energizing circuit in all of these tracks.

In the construction shown in FIGS. 1–4, the regulation of the multiple pulses energizing the multiple-track recording head 17 is obtained by connecting the contactors 14 of all of the commutator wafer switches through their respective slip rings 13 and stationary contacts 15 by a common line 15' to a common regulating contactor 34 which is conveniently insulatedly mounted on a bracket 35 secured to the main mounting plate 20 of the commutator. An electrically conductive cam plate 36 is rigidly mounted on the shaft 22 and is provided with a plurality of contactor engaging camming teeth 37. These teeth 37 correspond in number and peripheral spacing to the stationary contacts 11 of the commutator wafer switches, and the cam plate 36 is mounted on the shaft 22 such that the teeth 37 are axially aligned with respectively axially aligned stationary contacts 11 of the commutator switches. The teeth 37 are of lesser arcuate extent than the stationary contacts 11 so that the engagement between the teeth 37 and the contactor 34 is of shorter duration than the engagement of the wafer contactors 14 with individual stationary wafer switch contacts 11. Thus the electrical energizing circuit lines for the recording head coils is connected through the digit switches and through the commutator wafer switches prior to its completion by the engagement of the contactor 34 with a cam plate tooth 37, and this energizing circuit is broken by the disengagment of the contactor 34 with a cam plate tooth 37 prior to the disengagement of a contactor 14 with a contact 11 of a commutator wafer switch. This assures that the energization of the recording head coils which are to be energized all are concurrently energized to initiate a recording pulse and all are concurrently deenergized so as concurrently to end all of the pulses in the multiple-tracks. In order to assure this operation of the commutator regulating device, the contactor mounting bracket 35 is adjustably secured to the mounting plate 20 so that it can be rotated slightly so as to adjust the initiation and ending of the engagement of the contactor 34 with the cam plate teeth 37. This has the effect of shifting the initiation and the ending of these pulses angularly relative to the stationary contacts 11 of the commutator wafer switches and is more clearly understandable by reference to FIG. 12. It also has the effect of controlling the duration of such pulses in accordance with the movement of the contactor 34 toward or away from the cam plate teeth 37.

As shown in FIG. 12, the energizing circuit of the coils of the four-track recording head 17 initiates the pulse by the closure of the energizing circuit through the contactor 34 and one of the cam plate teeth 37 at a time which may be represented by the dotted line 38 and the breaking of the circuit by disengagement of the contactor 34 with a cam plate tooth 37, as indicated by the dotted line 39. The result is that the pulses in the four tracks of the recording head 17 are not initiated as shown by the dotted lines 26, 28, 30, and 31, but are initiated as shown by the solid lines 26', 28', 30', and 31', and similarly the pulses do not end as indicated by the dotted lines 27, 29, 32, and 33, but actually end as indicated by the solid lines 27', 29', 32', and 33'. Thus, the commutator is provided with a multiple-pulse regulating device which comprises a plurality of multiple-circuit making and breaking contactors which are simultaneously operable for substantially simultaneously making and substantially simultaneously breaking a plurality of electric circuits through the wafer switches of the commutator, and the cam plate is operable concurrently with the multiple-circuit making and breaking wafer switches to control the making and breaking of the energizing circuits of the multiple-track recording head through the contactor 34 and the cam plate teeth 37 so as concurrently to initiate and concurrently to end electric energizing pulses in all of the circuits which are made and broken by the wafer switches of the commutator.

In a magnetic digital recorder of the type schematically illustrated in FIG. 4, it is desirable to provide the commutator with an arrangement which will give the operator of the recorder a definite indication of the beginning and end of a recording cycle. In a commutator such as that shown in FIGS. 1–3, a complete recording cycle requires that the commutator be operated one full turn. The start and end of a recording cycle is easily determined by the operator in turning the commutator operating knob 23 in this construction, as a simple releasable latching detent is provided which latches the commutator at the end of each operating cycle and is adapted to be released simply by turning the knob 23 to start a new cycle. This latching device includes a detent ball 40 which is freely movably mounted in a guide aperture in the main mounting plate 20 and is biased against the adjacent surface of the cam plate 36 in any suitable manner, as by a flexible leaf spring 41 secured to the mounting plate 20. The cam plate 36 is formed with a slight depression or recess 42 in the upper surface thereof on the same radius as the detent ball 40 so that when the cam plate has reached the end of an operating cycle for the commutator, the detent ball 40 is seated by the spring 41 into latching engagement in the recess 42. This normally will resist continued turning of the operating knob 23 such that the operator is given a definite indication that the operating cycle has been complated. When a new operating cycle is to be begun, it is only necessary to exert a slightly greater pressure to start turning the knob 23 than is required for continued turning thereof so that the detent ball 40 will ride out of the recess 42 and onto the adjacent upper surface of the cam plate 36.

Figure 3:
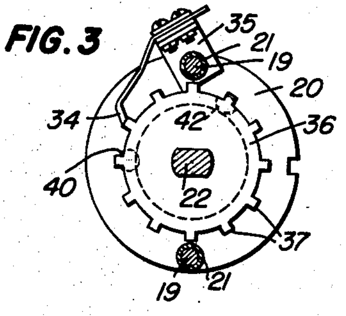
FIG. 3 is a sectional view, taken along line 3—3 of FIG. 1, illustrating structural details of the pulse-regulating mechanism shown in FIG. 1.

In some instances it is desirable to have the regulating device contactor 34 in engagement with a specific cam plate tooth 37 at the end of an operating cycle. Where this is the case, the recess 42 is formed in the cam plate along the same radius as the tooth which is to be in engagement with the contactor 34 at the end of an operating cycle. This construction is illustrated in FIGS. 1 and 3. If it is desired to have the recording head completely deenergized at the end of an operating cycle, the recess 42 may be formed in the cam plate between two of the teeth 37 such that the detent ball 40 will be seated in the recess 42 when the pulse regulating contactor 34 is out of engagement with all of the teeth 37 of the cam plate. This assures complete deenergization of the recorder at the end of each operating cycle.

In FIG. 5 a modification of the embodiment of the pulse regulating device disclosed in FIGS. 1–4 is illustrated, and its connection in the circuit of a recorder is partially schematically illustrated in FIG. 6. The general construction of the commutator wafer switches is the same as that shown in FIGS. 1 and 2. The major difference in this embodiment of the invention over that shown in FIGS. 1–4 is that the pulse regulating device is provided with an arrangement whereby the duration of a pulse can be more fully and independently regulated, as well as its timing. In this construction, a cam plate 44 is provided which is mounted fixedly on the commutator shaft 22 in the same manner as the cam plate 36 is mounted on that shaft 22 in the FIGS. 1–4 construction; however, this cam plate does not effect the actual grounding of the electrical circuit of the recording system through itself. The pulse regulating device in this embodiment includes a movable contactor 45 mounted on a resilient arm 46 which is insulatedly supported on a bracket 47 adjustably secured to the mounting plate 20. The contactor 45 is formed with an insulating cam follower button 48 on the end thereof adjacent to the cam plate 44 which is adapted to be engaged by the teeth 49 on the cam plate 44 as the cam plate is rotated. A contactor 50 is adjustably mounted in any suitable manner, as by threaded engagement with a mounting arm 51, on the bracket 47. The mounting arm 51 is insulated from the bracket and from the arm 46 in any suitable manner, as by an insulating bushing 52 arranged between the arms 46 and 51 and by providing insulating bushings around mounting bolts 53 which secure the arms 46 and 51 to the bracket 47. A lock nut 54 preferably is screwed on the threaded shank 50′ of the contactor 50 so as to secure it in its adjusted position and to prevent its accidental change of position due to repeated engagment of the contactor 50 by the contactor 45 as the teeth 49 of the cam plate 44 move the contactor 45 into engagement with the contactor 50.

As is best shown in FIG. 6, the ends of the mounting arms 46 and 51 respectively of the contactors 45 and 50 are electrically connected in the series energizing circuit of the recorder. An energizing pulse is sent to a recording head connected to the commutator wafer switches through digit switches in the same manner as in FIG. 4 whenever the energizing circuit is closed through the engagement of the common contactors 45 and 50. As in the construction shown in FIGS. 1–4, the commutator wafer switches provide an engagement of the wiper contactors 14 with stationary contacts 11 prior to closure of the energizing circuit by engagement of the pulse regulating contactors 45 and 50. This assures the concurrent beginning or initiation of a pulse in all of the tracks of the magnetic recording head as has been explained with reference to the FIGS. 1–4 embodiment and graphically illustrated in FIG. 12. Similarly, the ending of the energizing pulse in all tracks of the recording head occurs concurrently as the energizing circuit is opened by the disengagement of the pulse regulating contactors 45 and 50 prior to the disengagement of the commutator wiper contactors 14 with stationary contacts 11. This operation also is similar to that explained with reference to FIGS. 1–4 and graphically illustrated in FIG. 12.

In the present construction there is the additional feature which provides for independently adjusting the position of the pulse regulating contactor 50 with reference to the contactor 45 by moving it nearer or farther from the contactor 45. This adjustment may readily be obtained simply by adjusting its threaded engagement position with the mounting arm 51. If the contactor 50 is moved closer to the contactor 45 such that they come into engagement when a camming tooth 49 moves the contactor 45 only slightly and remains in engagement until the contactor follower button 48 is substantially out of engagement with a camming tooth 49, the duration of the engagement of the contactors 45 and 50 is relatively long and the pulse duration will be correspondingly long. This pulse duration is indicated graphically in FIG. 12 by the distance between the dotted lines 38 and 39. These two lines can be moved closer together so that the duration of the energizing pulse for the recording head is relatively shorter simply by screwing the contactor 50 into its mounting arm 51 away from the contactor 45 such that the contactor 45 must be moved a greater distance before it engages the contactor 50 when a camming tooth 49 engages the contactor follower button 48 and disengages the contactor 50 sooner when a camming tooth 49 passes out of engagement with the contactor button 48 sooner. Thus the duration of a pulse can be varied within certain limits by a relatively simple adjustment of the pulse regulating device.

The timing of the pulses also can be adjusted, as in the arrangement shown in FIGS. 1–3, by shifting the angular position of the bracket 47 on its mounting; that is, by turning it slightly so as to change the relative position at which the contactor follower button 48 is engaged by a camming tooth 49. Such an adjustment of the bracket 47 provides for shifting of the timing of the pulse and may be graphically represented in FIG. 12 as a shifting of both of the lines 38 and 39 to the right or to the left in this figure without changing the spacing between these two lines; that is, without changing the duration of a pulse. This shifting of the timing may be found desirable in order to assure that a pulse always begins after all of the contactors 14 have engaged their respective stationary contacts 11 and that the pulse ends prior to the disengagement of all of the contactors 14 with their respective stationary contacts 11. In some instances it may be found necessary to shorten the duration of a pulse in order to provide this type of operation of the pulse regulating device and to obtain concurrent initiation and ending of the pulses in all of the tracks of the recording head.

In this construction the end of an operating cycle also is indicated to an operator by a readily releasable latching detent structure similar to that shown in FIG. 1, wherein a detent ball 40 is adapted to seat at the end of an operating cycle in a recess 42 formed in the cam plate 44 so as to exert a slight resisting force to further turning of the operating knob 23 of the commutator.

A further embodiment of the present invention is illustrated in FIG. 7 and schematically shown connected in the circuitry of a commutator which may be used in a magnetic digital recorder such as that shown in FIG. 4. In this embodiment the commutator is provided with a plurality of wafer switches similar to those illustrated in FIGS. 1 and 2 having movable wiper contactors 14 which are adapted to engage stationary contacts 11 as in the previously described embodiments. The stationary wiper contactors 15 of the commutator wafer switches are all connected in this instance by the line 15' to a terminal 56 of the pulse regulating device. This terminal 56 is electrically connected to a pulse regulating contactor 57 which is adjustably mounted in any suitable manner on a mounting arm 58 electrically connected to the terminal 56. In the illustrated construction, the contactor 57 is provided with a threaded shank 57' screwed into a mounting arm 58 to provide the desired adjustment of the contactor 57 toward and away from the mounting arm 58. This embodiment is very similar to the adjustable contactor portion of the embodiment illustrated in FIG. 5, and a second pulse regulating contactor 59 is mounted on an arm 60 and arranged to make and break an electrical circuit by engagement and disengagement with the contactor 57. This making and breaking of the electrical circuit is obtained by movement of the contactor 59 toward and away from the contactor 57, and this movement is provided by engagement of a follower button 61 with camming teeth 62 on a cam plate member 63 when the cam plate member 63 is rotated.

The duration of a pulse for energizing the tracks of the recording head may be adjusted by screwing the contactor 57 in its mounting on the arm 58 so as to move the contactor 57 toward or away from the contactor 59, whereby the contactor 59 will engage the contactor 57 respectively sooner or later as the contactor follower button 61 is engaged by a camming tooth 62 and will disengage the button 57 later or sooner respectively so as to increase or decrease the duration of an energizing pulse sent to the recording head.

If desired, a stop 64 may be provided which will limit the movement of the contactor mounting arm 58 toward the contactor 59, thereby minimizing sticking together of the contactors 57 and 59. Also, an adjustable stop 65 which may comprise a screw which can be moved toward and away from the contactor mounting arm 60 may be provided which will limit the movement of the contactor mounting arm 60 toward the cam plate 63. Both of the stops 64 and 65 are insulated so as to prevent grounding of the system therethrough. The stop 65 will have the effect of limiting the duration of engagement of the contactor button 61 with a camming tooth 62 and thereby minimize wear of these parts. Preferably, the stop 65 is adjusted so that the contactor follower button 61 will be engaged by a camming tooth 62 just prior to the engagement of the contactor 57 by the contactor 59. The position of the stop 65 should, however, be such as to provide for a sufficient gap between the contactors 57 and 59 when the contactor follower button 61 is out of engagement with camming teeth 62 so as to assure a complete break in the electrical circuit between the contactors 57 and 59 and to minimize or shorten arcing therebetween.

In this construction, a resiliently biased ball detent 40 is provided which is constructed and operates in the same manner as the readily releasable latching detent illustrated in FIG. 1. As shown in FIG. 7, the cam plate recess 42 is shown as being located between two of the camming teeth 62 such that the detent ball 40 will come to rest in the recess 42 and indicate the end of an operating cycle at a time when the energizing circuit of the recorder is open circuited through the contactors 57 and 59.

This embodiment of the present invention is provided with a two part cam plate of which the outer portion 63 on which the camming teeth 62 are formed is a ring which surrounds a central mounting disc plate 63'. This inner cam disc plate 63' is rigidly mounted in any suitable manner on the commutator shaft 22, and it is adjustably secured to the cam plate outer ring part 63 so as to provide for relative angular adjustment between the disc 63' and the ring 63. A bracket 66 is rigidly mounted on the cam plate disc 63', and a second bracket 67 is rigidly mounted on the cam plate ring 63 and adjustably secured to the bracket 66 in any suitable manner, as by a screw 68. The screw 68 preferably loosely extends through an aperture in the bracket 67 and threadedly engages a complementary threaded opening in the bracket 66, so that adjustment of the screw 68 in its threaded engagement with the bracket 66 will move the brackets 66 and 67 toward or away from each other. Such adjustment of the relative positions of the brackets 66 and 67 produces a corresponding adjustment of the relative angular positions of the cam plate disc 63' and the cam plate ring 63. A compression spring 69 is arranged between the adjacent surfaces of the brackets 66 and 67 and preferably is positioned around the portion of the screw 68 which extends between these brackets so as to bias the two brackets apart, thereby resiliently maintaining the desired spacing therebetween and resiliently maintaining the desired relative angular position between the cam plate disc 63' and the cam plate ring 63. Adjustment of this relative angular position between the two parts of the cam plate provides a corresponding adjustment of the timing of the energizing pulses sent to the recording head of the system. FIG. 12 graphically illustrates the pulses which energize the multiple-track recording head, and the relationship of the pulses to the opening and closing of the various parts of the electrical circuit of the system has been explained with reference to this figure in connection with FIG. 1. Adjustment of the screw 68 to adjust the relative angular position between the cam plate disc 63' and the cam plate ring 63 provides for shifting of the pulses which may be graphically illustrated in FIG. 12 as shifting of the pulses to the right or left.

The pulse regulating device shown in FIG. 12 illustrates the type of contactors shown in FIGS. 7 and 8. As can readily be seen from FIG. 12, the closing of the circuit through the contactors 57 and 59 begins when a camming tooth 62 in engagement with the contactor follower button 61 actuates the mounting arm 60 to a position wherein the contactor 59 comes into engagement with the contactor 57. Further rotation of the cam plate 63 moves the camming tooth 62 is indicated by the arrow 70 in this figure and the circuit remains closed during the time that the contactors 57 and 59 are in engagement with each other. This engagement continues until the camming tooth 62 has moved to the dotted position shown in this figure, after which the contactor follower button 61 permits the contactor 59 to move downwardly out of engagement with the contactor 57 when the contactor 57 is prevented from continuing in engagement with the contactor 59 by the stop 64. This embodiment of the invention provides for both a positive independent adjustment of the duration of the pulses and also for an adjustment of the timing of the pulses and assures a concurrent initiation and concurrent ending of the energizing pulses sent to the magnetic recording head of the system, thereby assuring transverse alignment of the magnetic bits in the various tracks on the magnetic tape on which the information is recorded by the recording head of the system.

A modification of the embodiment of the present invention illustrated in FIGS. 7 and 8 is shown in FIGS. 9 and 10. In this construction, a commutator is provided with a multiple-pulse regulating device, similar to those previously described, for regulating the duration of a plurality of substantially simultaneously occurring pulses, for regulating the timing of such multiple-pulses, and for assuring the concurrent initiation and ending of the substantially simultaneous multiple-pulses. The commutator is provided with a plurality of wafer switches similar to those illustrated in detail in FIGS. 1 and 2, wherein the energization of the electrical system adapted to be commutated by the wafer switches is provided through the stationary contacts 15 of the wafer switches, all of which are connected together to a terminal 71 of a pulse regulating device. This pulse regulating device comprises a movable contactor 72 mounted on an arm 73 which is electrically connected to the terminal 71 and is adapted to be operated by a cam plate of the same type as that shown in FIG. 7. The cam plate comprises an outer circular ring member 63 adjustably secured to an inner disc member 63' which is fixedly mounted on the commutator shaft 22. These two parts of the cam plate are secured together in the same manner as in FIG. 7 through brackets 66 and 67 mounted respectively on the cam plate members 63 and 63' and adjustably secured together by a screw 68 which extends through an aperture in the bracket 67 and threadedly engages a complementary threaded opening in the bracket 66. A compression spring 69 is arranged around the screw 68 between adjacent surfaces of the brackets 66 and 67 and biases these two brackets apart. Relative angular adjustment between the cam plate circular member 63 and the cam plate central disc 63' can readily be obtained by screwing the screw 68 in or out of the bracket 66. This adjustment provides for regulating the timing of the pulses as has been explained with reference to this type structure in FIG. 7.

As in the other constructions, a latching detent ball 40 is adapted to seat in a recess 42 in the cam plate at the end of each operating cycle. The details of this latching device are illustrated and described with reference to FIGS. 1 and 3.

Turning of the cam plate 63 through an operating knob 23 and commutator shaft 22 sequentially turns cam teeth 62 into engagement with the contactor 72. In this construction, the circuit which is being commutated is grounded through the cam plate and the commutator shaft 22 whenever the contactor 72 is in engagement with a cam plate tooth 62. The duration of the engagement of the contactor 72 with a cam plate tooth 62 determines the time during which the electrical circuit is closed, and the time at which a cam plate tooth 62 engages the contactor 72 initiates the energizing pulse, while the disengagement of a cam plate tooth 62 from the contactor 72 ends the energizing pulse in the electrical system. This operation is similar to that which has been explained with reference to the other embodiments of this invention and which is diagrammatically illustrated in FIG. 12 which provides for concurrently initiating a pulse in each of a plurality of parallel circuits or tracks and for concurrently ending such pulses in all of the circuits or tracks.

Adjustment of the duration of these pulses in this embodiment is obtained for adjusting the time during which a cam plate tooth 62 remains in engagement with the contactor 72. This adjustment can readily be obtained by adjusting the position of the contactor 72 radially relative to the cam plate teeth 62. This radial adjustment may be conveniently obtained by a simple adjustable stop. Such a stop may comprise a screw 74 threadedly engaged in a complementary threaded opening in the contact supporting arm 73 arranged to engage an insulating stop 75 so as to control the innermost position to which the contactor 72 can extend in contact with a cam plate tooth 62. When the screw 74 is screwed toward the insulating stop 75, the duration of a pulse is reduced, whereas when the screw 74 is screwed away from the stop 75 the duration of a pulse is increased. For some purposes this type of structure may be found to be the most practical as it is relatively light weight and easy to adjust.

In FIG. 11 a further modification of a multiple-pulse regulating device embodying the present invention is illustrated which includes the operating cycle latching device detent structure shown in FIGS. 1 and 3 of a detent ball 40 adapted to seat in a recess 42 formed in the cam plate of the device.

In this embodiment, the cam plate is similar to that shown in the embodiments of FIGS. 7–10 including an outer circular member 63 with cam teeth 62 and an inner cam plate disc 63' rigidly secured on a commutator shaft 22. This construction is adapted to be mounted on a commutator having a plurality of circuit making and breaking contacts, which may comprise wafer switches such as those shown in the other embodiments having a supply contact which is connected to a terminal 76 of the multiple-pulse regulating device. This terminal 76 provides an electrical connection to a contact supporting arm 77 on which a contact 78 is mounted. A cooperating contact 79 is mounted on an arm 80 and is adapted to engage the contact 78 for making and breaking an electrical circuit therethrough which regulates the initiation and ending of electrical pulses in the system. The circuit is made and broken between the contacts 78 and 79 as these contacts are moved into and out of engagement with each other by the engagement of a contactor 81 which is adjustably mounted on the arm 80 and is adapted to be engaged by the cam plate teeth 62.

In this construction, the contactor 81 is adjustably mounted on the arm 80 to regulate the time at which it is engaged with a cam plate tooth 62 and the time at which it is disengaged with such a tooth. This time of engagement and disengagement is conveniently regulated simply by mounting the contactor 81 on a screw 82 which is threadedly engaged in a complementary threaded opening in the contract supporting arm 80. Thus, when the screw 82 is screwed toward the cam plate teeth 62, the duration of the engagement of the contacts 78 and 79 is lengthened with a resultant lengthening of the duration of the pulses, and when the screw 82 is screwed away from the cam plate teeth 62, it has the opposite effect and shortens the duration of the pulses. An insulating stop 83 is provided for limiting the movement of the contact 78 toward the contact 79 whereby breaking of the electrical circuit therebetween is assured and arcing of the contacts is eliminated or minimized.

If desired, the embodiment shown in FIG. 11 may be modified so as to eliminate the contacts 78 and 79, the arm 77, and the stop 83. The terminal 76 to which the remainder of the electrical system is connected would then simply be connected to the end of the arm 80 and an insulating stop 84 would be provided to limit the movement of the arm 80 toward the cam plate. With such a construction, the duration of a pulse would be regulated in the same manner as when the contacts 78 and 79 are provided simply by screwing the screw 82 toward or away from the cam plate teeth 62. The duration of the pulses thus would be determined by the duration of the engagement of the contactor 81 with cam plate teeth 62. For certain purposes, this type of construction might be preferred in that it provides for a more direct adjustment of the duration of pulses.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A multiple-pulse regulating device comprising a plurality of multiple-circuit making and breaking means simultaneously operable for substantially simultaneously making and substantially simultaneously breaking a corresponding plurality of electric circuit lines therethrough, each of said respective plurality of circuit making and breaking means having individual terminals each connectible in a separate one of the multiple-circuits and also having a common terminal separately connectible through the respective circuit making and breaking means to each of said individual terminals, a single circuit connecting together all of said common terminals, and a common electric pulse regulating means comprising a single circuit making and breaking element connected in series with said single connecting circuit for making and breaking said single circuit and concurrently making and concurrently breaking the electric circuit lines respectively closed and opened through all of said plurality of multiple-circuit making and breaking means.

2. A multiple-pulse regulating device comprising a plurality of multiple-circuit making and breaking means, means for simultaneously operating said plurality of multiple circuit making and breaking means for substantially simultaneously closing and substantially simultaneously opening a plurality of electric circuit lines respectively therethrough, each of said respective plurality of circuit making and breaking means having individual terminals each connectible in a separate one of the multiple circuits and also having a common terminal separately connectible through the respective circuit making and breaking means to each of said individual terminals, a single circuit connecting together all of said common terminals, and electric pulse regulating means comprising a single circuit making and breaking element connected in series with said single connecting circuit for making and breaking said single circuit and operable by said multiple-circuit making and breaking means operating means and concurrently therewith for simultaneously initiating and simultaneously ending electric pulses in all circuits made and broken respectively through said plurality of multiple-circuit making and breaking means.

3. A multiple-pulse regulating device comprising a plurality of multiple-circuit making and breaking means, means for simultaneously operating said plurality of multiple-circuit making and breaking means for substantially simultaneously making and substantially simultaneously breaking electric circuit stherethrough, electric pulse regulating means including a circuit breaker operable by said multiple-circuit making and breaking means operating means and connected in series with all of said plurality of multiple-circuit making and breaking means providing for concurrently initiating and concurrently ending electric pulses in all circuits made and broken by said plurality of multiple-circuit making and breaking means, and means for adjusting said pulse regulating means circuit breaker for concurrently oppositely adjusting the pulse initiation and pulse ending whereby the duration thereof can be varied.

4. A multiple-pulse regulating device comprising a plurality of multiple-circuit making and breaking means simultaneously operable for substantially simultaneously making and substantially simultaneously breaking electric circuit lines therethrough, each of said respective plurality of circuit making and breaking means having individual terminals each connectible in a separate one of the multiple-circuits and also having a common terminal separately connectible through the respective circuit making and breaking means to each of said individual terminals, a single circuit connecting together all of said common terminals, and a common electric pulse regulating means comprising a single electric circuit making and breaking element electrically connected in a series with said single connecting circuit and operable concurrently with said multiple-circuit making and breaking means for simultaneously closing electric circuits therethrough subsequent to the closing of circuit lines and simultaneously breaking electric circuits therethrough prior to the opening of circuit lines respectively through said plurality of multiple-circuit making and breaking means.

5. A multiple-pulse regulating device comprising a plurality of multiple-circuit closing and opening means simultaneously operable for substantially simultaneously closing and substantially simultaneously opening electric circuits therethrough, electric pulse regulating means including a circuit breaker electrically connected in series with all of said plurality of multiple-circuit closing and opening means and operable concurrently therewith for simultaneously initiating electric pulses in said circuits subsequent to the closing of all circuits and simultaneously ending such electric pulses prior to the opening of any circuit by said plurality of multiple-circuit closing and opening means, and means for adjusting said pulse regulating means circuit breaker for concurrently oppositely adjusting the pulse initiation and pulse ending whereby the duration thereof can be varied.

6. A multiple-pulse regulating device comprising a plurality of multiple-circuit making and breaking means simultaneously operable for substantially simultaneously making and substantially simultaneously breaking a plurality of electric circuits therethrough, electric pulse regulating means including a circuit breaker electrically connected in series with all of said multiple-circuit making and breaking means providing for simultaneously initiating and simultaneously ending electric pulses in all circuits made and broken by said plurality of multiple-circuit making and breaking means, and means for shifting the timing of the operation of said regulating means circuit breaker relative to the making and breaking of said plurality of circuits by said multiple-circuit making and breaking means for shifting the timing of the pulses.

7. A multiple-pulse regulating device comprising a plurality of multiple-circuit making and breaking means simultaneously operable for substantially simultaneously making and substantially simultaneously breaking a plurality of electric circuits therethrough, electric pulse regulating means including a circuit breaker electrically connected in series with all of said multiple-circuit making and breaking means providing for simultaneously initiating and simultaneously ending electric pulses in all circuits made and broken by said plurality of multiple-circuit making and breaking means, means for adjusting said pulse regulating means for concurrently oppositely adjusting the pulse initiation and pulse ending whereby the duration thereof can be varied, and means for shifting the timing of the operation of said regulating means circuit breaker relative to the making and breaking of said plurality of circuits by said multiple-circuit making and breaking means for shifting the timing of the pulses.

8. A multiple-pulse regulating device comprising a plurality of multiple-circuit making and breaking means simultaneously operable for substantially simultaneously making and substantially simultaneously breaking a plurality of electric circuits therethrough, electric pulse regulating means including a circuit breaker electrically connected in series with all of said multiple-circuit making and breaking means providing for simultaneously initiating and simultaneously ending electric pulses in all circuits made and broken by said plurality of multiple-circuit making and breaking means, means for shifting the occurrence of the operation of said regulating means circuit breaker relative to the making and breaking of said plurality of circuits by said multiple-circuit making and breaking means, and means for releasably latching said regulating means including a circuit breaker at the end of an operating cycle.

9. A multiple-pulse regulating device comprising an operating shaft, means for rotatably supporting said shaft, a plurality of spaced multiple-contact wafer switches, means for fixedly mounting said wafers on said shaft supporting means with corresponding contacts of different wafers substantially in axially aligned sets, a wiper contactor associated with each wafer and insulated from and drivingly mounted substantially in axial alignment on said shaft operable thereby to engage separately each contact of its respective multiple-contact wafer switch, and electric pulse regulating means operable concurrently with operation of said wiper contactors and electrically connected in series therewith for closing a circuit therethrough subsequent to the making of contact by all of said wiper contactors with any one set of aligned contacts on associated wafer switches and for opening such circuit prior to the breaking of contact by any of said wiper contactors with any contact of such aligned set of contacts providing for concurrently energizing and simultaneously deenergizing all circuits through said wiper contactors.

10. A multiple-pulse regulating device comprising an operating shaft, means for rotatably supporting said shaft, a plurality of spaced multiple-contact wafer switches each having a wiper contactor insulated from and drivingly mounted substantially in axial alignment on said shaft operable thereby to engage separately each contact of its respective multiple-contact wafer switch, electric pulse regulating means including a circuit breaker electrically connected in series with said wiper contactors and operable concurrently with operation of said wipers for closing a circuit therethrough subsequent to the making of contact by all of said wiper contactors with any one set of aligned contacts on associated wafers and for opening such circuit prior to the breaking of contact by any of said wiper contactors with any contact of such aligned set of contacts providing for simultaneously energizing and simultaneously deenergizing all circuits through said wiper contactors, and means for concurrently oppositely adjusting the closing and opening of said electric pulse regulating means circuit breaker whereby the duration of such electric pulses can be varied.

11. A multiple-pulse regulating device comprising an operating shaft, means for rotatably supporting said shaft, a plurality of spaced multiple-contact wafer switches, means for fixedly mounting said wafer switches on said shaft supporting means with all corresponding contacts of different wafer switches substantially in axial alignment, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged substantially aligned contacts of the respective wafer switches, electric pulse regulating means including a circuit breaker connected in series with all of said wiper contactors for closing a circuit therethrough subsequent to the making of contact by all of said wiper contactors with any one set of aligned contacts on associated wafer switches and for opening such circuit prior to the breaking of contact by any of said wiper contactors with any contact of such aligned set of contacts, and means for concurrently oppositely adjusting the closing and opening of said electric pulse regulating means circuit breaker whereby the duration of such electric pulse can be varied.

12. A multiple-pulse regulating device comprising an operating shaft, means for rotatably supporting said shaft, a plurality of spaced multiple-contact wafer switches, means for fixedly mounting said wafer switches on said shaft supporting means with all corresponding contacts of different wafer switches substantially in axial alignment, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged substantially aligned contacts of the respective wafer switches, electric pulse regulating means comprising a cam plate having a plurality of camming teeth thereon corresponding in number with said contacts on each of said multiple-contact wafer switches and arranged respectively in alignment therewith, a contactor connected in series with all of said wiper contactors and operable by said camming teeth for closing a circuit therethrough subsequent to the making of contact by all of said wiper contactors with any one set of aligned contacts on associated wafer switches and for opening such circuit prior to the breaking of contact by any of said wiper contactors with any contact of such aligned set of contacts, and means for concurrently oppositely adjusting the closing and opening of said electric pulse regulating means contactor circuit whereby the duration of such electric pulse can be varied.

References Cited by the Examiner

UNITED STATES PATENTS

| | | | |
|---|---|---|---|
| 2,576,836 | 11/51 | Hilsinger | 200—4 |
| 2,620,672 | 12/52 | McMahon. | |
| 2,821,580 | 1/58 | Black | 200—11 X |
| 2,841,663 | 7/58 | Anderson | 200—166 X |
| 2,973,667 | 3/61 | Williams | 200—11 X |
| 2,985,725 | 5/61 | Du Vall | 200—11 |
| 3,013,231 | 12/61 | Meadows et al. | |

BERNARD A. GILHEANY, *Primary Examiner.*